J. N. GOODALL.
PIPE COUPLING.
APPLICATION FILED JAN. 27, 1913.
1,132,086.  Patented Mar. 16, 1915.
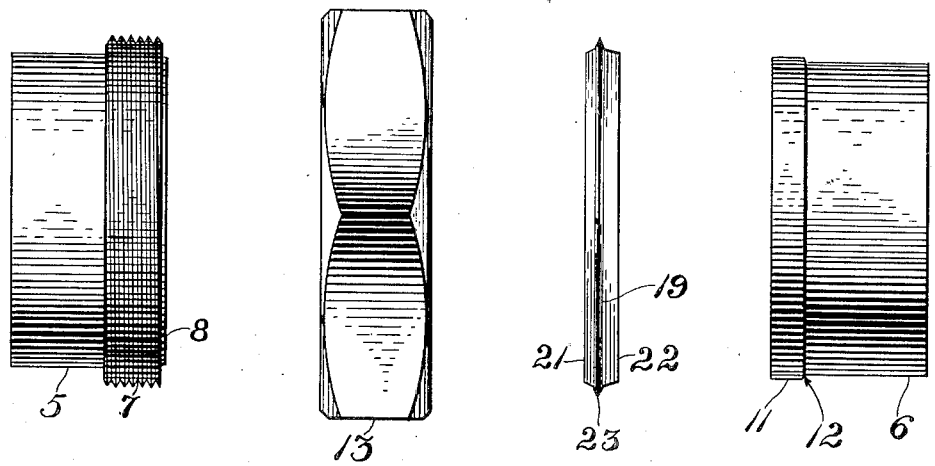
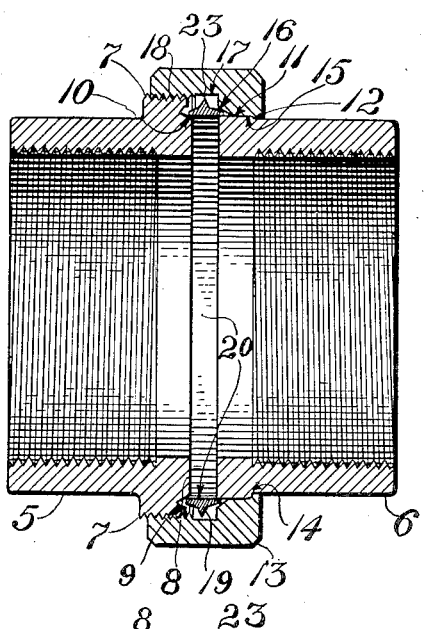
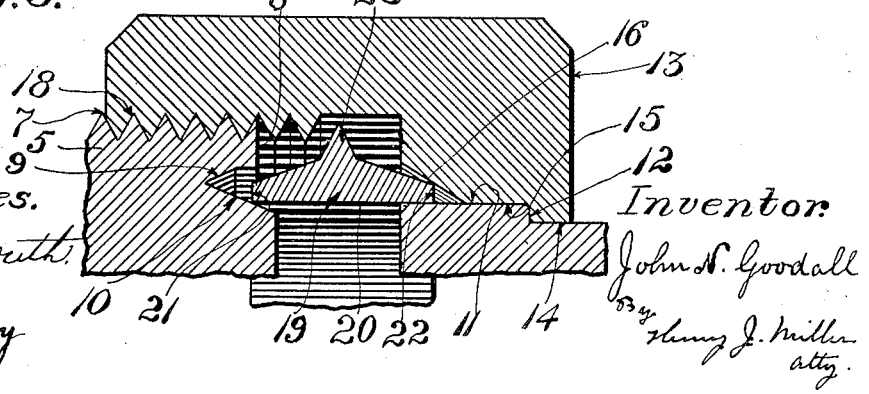
Witnesses.
L. B. Weymouth
E. C. Murphy
Inventor.
John N. Goodall
By Henry J. Miller
atty.

UNITED STATES PATENT OFFICE.

JOHN N. GOODALL, OF MELROSE, MASSACHUSETTS.

PIPE-COUPLING.

1,132,086.  Specification of Letters Patent.  Patented Mar. 16, 1915.

Application filed January 27, 1913. Serial No. 744,291.

*To all whom it may concern:*

Be it known that I, JOHN N. GOODALL, of Melrose, in the county of Middlesex and State of Massachusetts, have invented certain new and useful Improvements in Pipe-Couplings, of which the following is a specification, reference being had to the accompanying drawings, forming part thereof.

This invention has reference to improvements in pipe couplings and particularly in that class of pipe couplings in which provision is made to accommodate expansion and contraction of pipes connected by said couplings.

One object of the invention is to so construct a pipe coupling comprising a pair of collars, for attachment to pipes, and a bridge or spanner to span the space between said collars that said bridge or spanner may yield somewhat to accommodate itself to variations in the extension of the pipes.

Another object of the invention is to so construct a pipe coupling that a pair of pipe engaging collars may be coupled by a compression bridge member relative to which one of said collars may move.

Other objects of the invention will appear from the following description.

The invention consists in the novel bridge member and means for applying said member to the collars of the coupling.

The invention also consists in the improved pipe coupling as shall hereinafter be more fully described and pointed out in the claims.

Figure 1, represents the several members of the improved pipe coupling in side view. Fig. 2, represents a diagrammatical sectional view of the coupling with the parts assembled. Fig. 3, represents a view similar to Fig. 2 of fragments of the coupling members, greatly enlarged to more clearly show their construction.

Similar characters of reference designate corresponding parts throughout.

In carrying this invention into practice in its preferred form I construct a pair of collars 5 and 6 adapted to be securely mounted on the ends of two pipes, in approximate alinement, which it is desired to couple or connect. Collar 5 has the extension screw thread 7 and the end face 8 furnished with the groove 9 having the wall 10 which is inclined to the general axial extension of this collar to form substantially a conical spreader member preferably extending slightly beyond the face 8 as will be seen by reference to Figs. 2 and 3. Collar 6 has the enlargement 11 forming the shoulder 12. Nut 13 has the flange 14, closely fitting the exterior of collar 6, and the surface 15 which is adapted to receive the enlargement 11 of collar 6 but is shorter than said enlargement 11 so that when the shoulder 12 of such enlargement 11 is seated against the flange 14 of said nut 13 a groove or receptacle is formed between the periphery of said enlargement 11 and the wall 16 flaring from said surface 15 toward the bridge chamber 17 of said nut 13, which chamber is of a diameter preferably exceeding the internal diameter of the screw thread 18 which is adapted to receive the similar thread 7 of collar 5. The bridge member 19 has the inner wall 20 adapted to be received on the conical spreader 10 of collar 5 and to have a close sliding fit on the enlargement 11 of collar 6, the edges 21 and 22 of the spanner extending respectively into the groove 9 of collar 5 and into the groove formed between the periphery of said enlargement 11 and the flaring wall 16 of nut 13, while the web 23 of said bridge member 19 is received in the chamber 17 of said nut 13.

The bridge member 19 is of comparatively hard metal but is thin and readily may be sprung sufficiently that its web 23 may be engaged with the screw threads 18 of nut 13 and screwed along said thread until said web or fin is received by the chamber 17 of said nut 13, in which chamber said web or fin is free to move laterally and rotate.

In making use of this coupling to connect the ends of two pipes which are substantially in alinement the nut 13 is slipped on to collar 6 and the collars 5 and 6 are screwed or otherwise secured to the respective pipes. Nut 13 is then slid along collar 6 until the screw thread 18 of said nut is brought to the thread 7 of collar 5 and said nut is then rotated to engage said threads and advance said nut along collar 5 until the edge 21 of bridge member 19 enters groove 9. In the continued taking up of nut 13 the flaring wall 16 forces the bridge member along until the engagement of the edge 21 of the bridge member bears on the spreader 10 of collar 5 after which point is reached the continued pressure of said wall 16 acts to force edge 21 over the enlarging conical surface of said spreader while, at the same time the flaring wall 16 acts to compress the edge 22 of the bridge member against the surface of enlargement 11 of collar 6. Thus the member 19 bridges the space between collars 5 and 6 and the edges 21 and 22 are pressed respectively inwardly and outwardly against the surfaces of the spreader 10 and of the collar enlargement 11.

Actual practice demonstrates the fact that while the edge 22 of bridge member 19 is so compressed against the collar enlargement 11 as to make a tight joint the frictional engagement of these parts permits a degree of relative movement so that under expansion of pipes connected by this coupling the collars 5 and 6 may move toward and from each other.

While I have herein shown and described the preferred construction of this improved coupling it is not my intention thereby to limit my invention except as hereafter claimed.

Having thus described my invention I claim as new and desire to secure by Letters Patent—

1. A coupling comprising a pair of collars one of which has a screw thread and a conical surface, the other of which has an enlarged end, a nut having a screw thread engaging with said screw thread of said first collar and a flange engaging the enlargement of said second collar, said nut having a flaring wall, and a bridge member located between the flaring wall of said nut and said conical surface.

2. A coupling comprising a nut having a chamber, a screw thread at one side of said chamber, a flange at the other side of said chamber, a straight wall extending inward from said flange, a flaring wall extending from said straight wall, and a bridging member having a projection extending into the chamber of said nut, in combination with a pair of collars having end portions adapted to be drawn into engagement with said bridging member, one of said collars having a screw thread engaged by said collar.

3. A coupling comprising a pair of collars one of which has an exterior screw thread and a V shaped groove in its end, the other of which has an enlarged end, a nut having a bore slidable on said enlargement, a wall flaring from said bore and an internal screw thread engageable with the thread of said first collar, and a bridging member having comparatively thin edges one of which is adapted to be seated in the V shaped groove of the first collar and the other of which edges extends into the groove formed between the enlargement of said second collar and the flaring wall of said nut, substantially as described.

JOHN N. GOODALL.

Witnesses:
 HENRY J. MILLER,
 FRANK S. HEAD.